US009621677B1

(12) United States Patent
Bradley et al.

(10) Patent No.: US 9,621,677 B1
(45) Date of Patent: Apr. 11, 2017

(54) MONITORING ACCESSES TO COMPUTER SOURCE CODE

(71) Applicant: International Business Machines Corporation, Armonk, NY (US)

(72) Inventors: Lisa M. Bradley, Cary, NC (US); Christina R. Carlson, Chanhassen, MN (US); Andrew R. Freed, Cary, NC (US); Roderick C. Henderson, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/947,478

(22) Filed: Nov. 20, 2015

(51) Int. Cl.
*H04L 29/08* (2006.01)
*H04L 12/927* (2013.01)
*H04L 12/24* (2006.01)

(52) U.S. Cl.
CPC .......... *H04L 67/327* (2013.01); *H04L 41/069* (2013.01); *H04L 47/808* (2013.01); *H04L 67/22* (2013.01)

(58) Field of Classification Search
None
See application file for complete search history.

(56) References Cited

U.S. PATENT DOCUMENTS

| 7,096,219 | B1 * | 8/2006 | Karch | G06F 21/316 |
| 7,725,735 | B2 | 5/2010 | Fox et al. | |
| 8,621,237 | B1 | 12/2013 | Bailey et al. | |
| 2006/0174325 | A1 * | 8/2006 | Naglieri | H04L 63/08 726/3 |
| 2009/0165125 | A1 | 6/2009 | Brown et al. | |
| 2012/0240097 | A1 * | 9/2012 | Saunders | G06F 8/20 717/103 |

FOREIGN PATENT DOCUMENTS

WO   2014079307 A1   5/2014

* cited by examiner

*Primary Examiner* — Angela Nguyen
(74) *Attorney, Agent, or Firm* — Cantor Colburn LLP

(57) ABSTRACT

Aspects include monitoring accesses to computer source code. A method includes detecting an access, by a user, to a source code repository. It is determined whether the access is consistent with a history of accesses by the user to the source code repository. Based on determining that the access is not consistent with the history of accesses by the user, the access is analyzed for a reason for the user to perform the access. The analyzing is based on information about the user and information about the access. A notification of the access is generated based on the analyzing resulting in an absence of a reason for the user to perform the access.

18 Claims, 3 Drawing Sheets

MONITORING ACCESSES TO COMPUTER SOURCE CODE

BACKGROUND

The present invention relates generally to computers, and, more specifically, to monitoring accesses to computer source code.

Source code is an important corporate asset that should be protected, and source code monitoring tools are available to look for unauthorized behavior of users. These tools typically look for users trying to access code files that do not relate to their core work areas. Code files are grouped into classifications and users are labeled based on what files they should be working with. If a user attempts to accesses files in another grouping, this behavior can be prevented by not allowing access and/or can trigger a notification to a supervisor.

SUMMARY

Embodiments include a method, system, and computer program product for monitoring accesses to computer source code. A method includes detecting an access, by a user, to a source code repository. It is determined whether the access is consistent with a history of accesses by the user to the source code repository. Based on determining that the access is not consistent with the history of accesses by the user, the access is analyzed for a reason for the user to perform the access. The analyzing is based on information about the user and information about the access. A notification of the access is generated based on the analyzing resulting in an absence of a reason for the user to perform the access.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
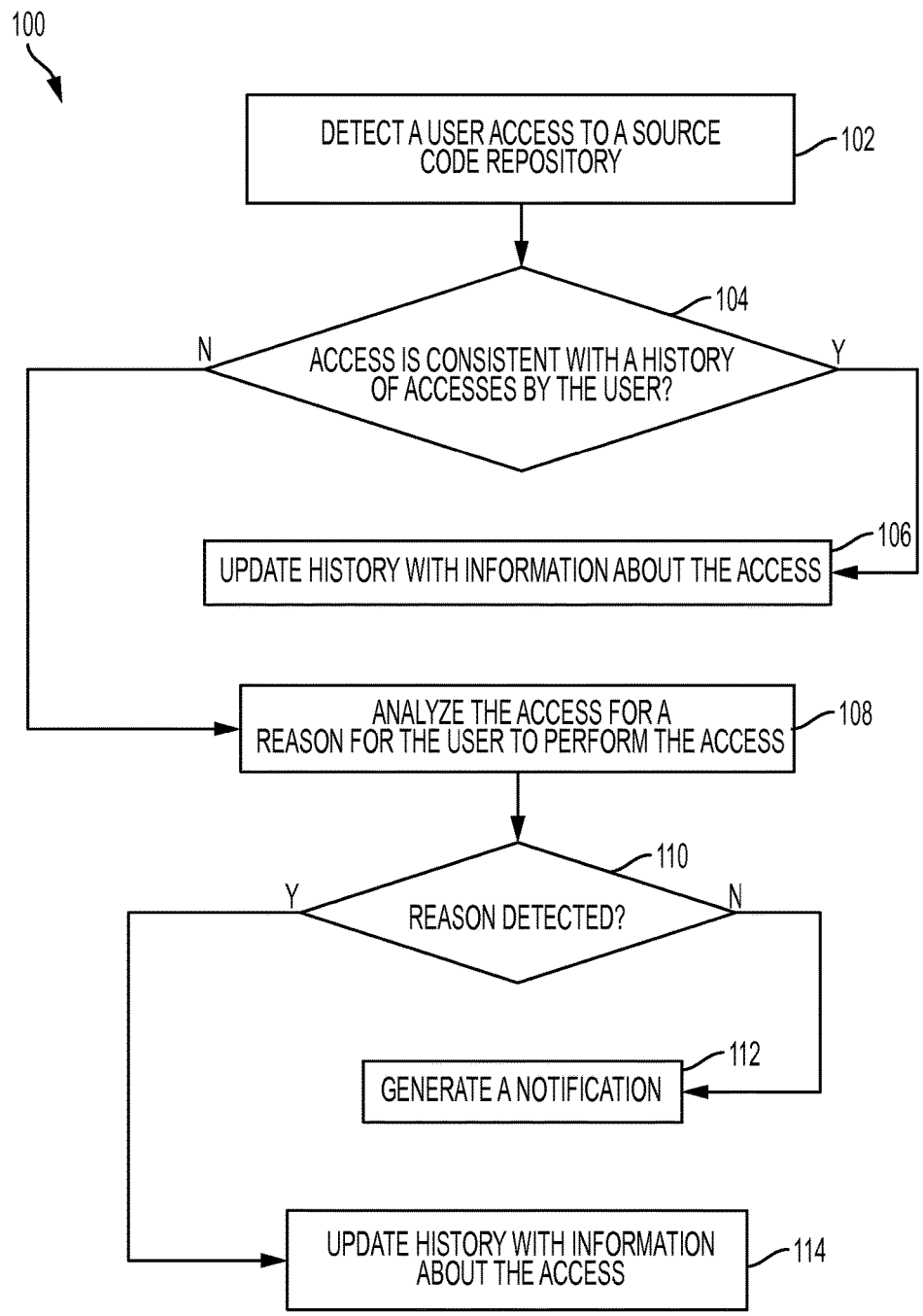
FIG. 1 depicts a process flow for monitoring accesses to computer source code in accordance with some embodiments of this disclosure.

Embodiments described herein are directed to detecting suspicious activities of a user on a work system, especially with respect to accessing source code repositories. Embodiments go beyond looking at files that a user is allowed to access and can record a user's typical usage patterns within a source code repository to determine out of the ordinary viewing and editing activities. Investigative intelligence reasoning can also be implemented by looking at things such as source code defects, work tasks assigned to the user, work team structure, etc. to determine the acceptability of the user's actions.

Contemporary tools for source code are not concerned with understanding a user's typical access patterns and detecting if a user's patterns change. Embodiments described herein are contrasted with contemporary tools which can find out if a user has gone in or out of a "sandbox" of files that the user is authorized to access. Embodiments described herein can determine whether a user is "playing" differently within the sandbox of files. For example, embodiments can be utilized to determine that a user is a code ingestion engineer who typically only views ingestion code, however yesterday it looked like the user was trying to find structured query language (SQL) injection bugs in the ingestion code.

Embodiments can also reduce the number of false positives a typical security product generates through monitoring new/suspicious activity and determining if the activity could be legitimate based on factors such as user role, program flow, team structure, defect analysis, etc. In addition, embodiments can be utilized to improve the sensitivity of source code monitoring by detecting not just file accesses, but searches which may indicate suspicious activity (such as searches which are intended to surface security defects).

Embodiments can identify unusual source code access by a user through monitoring source code access by a user to form a base history of access that records components accessed, viewing time, and editing time. Based on detecting an access by the user to a source code not in the base history, the access by the user to the source code can be analyzed for aspects related to the base history to form a base history consistency assessment. The base history consistency assessment can then be used for determining additional actions (e.g., notification, preventing access). In embodiments, when the base history consistency assessment is determined to be abnormal, the additional actions can include analyzing work requests received by the user for a reason for accessing the source not in the base history. If a reason is not detected (i.e., detecting an absence of a reason), a notification of the access can be sent to security personnel and/or other designated parties (e.g., managers, the user). In an embodiment a notification can be automatically sent when the base history consistency assessment is determined to be abnormal (and not after looking for a reason for the access).

Embodiments build a baseline of typical usage patterns by a user, building a basic signature of the way that a user works. This baseline signature can include the files a user accesses and the nature of the accesses (e.g., length of time, mouse/keyboard activity, number and type of updates, etc.), as well as the way the user interacts with their integrated development environment (IDE) such as their search patterns. The system can compare new activity to the baseline and in the case of suspicious activity, go through a series of filters to determine if the activity is truly suspicious. These filters can include, but are not limited to: determining if a program flow could typically flow into a file out of the user's usual working set, determining if the user should be in the file because his team is typically in it, and determining if defect analysis yields a legitimate reason for being in the file. If the suspicious activity is not absolved by these filters, then the system can continue on a course of action that includes notifications and/or a lockdown.

In an embodiment, a source code access monitoring system captures signature patterns/baseline of the user's activity in a source code base. The signature patterns/ baseline for one or more users can be stored as user access history data. The system can track and record information about the files a user visits and a frequency of the visits to these files. The system can also track and record how long the user focuses on a file, a number of mouse clicks while in the file, and keyboard activity while accessing the file. The system can further track and record scrolling in a file, times spent in particular sections of the file, and time spent in sections of the file that are noted as sensitive areas of the file. In addition, the system can track and record information about when the user edits a file and the typical edits the user does on files (e.g., adding functions to code or updating a deprecated function call). The system can also track and record information about the user's use of the IDE to track typical search terms, patterns, and history of the user's interactions with the IDE, including the use of potentially sensitive actions such as copy. The examples described herein of the types of information that can be tracked and recorded by the source code access monitoring system are exemplary in nature and not intended to be an exhaustive list of all of the types of information relating to source code access by a user or group of users that can be tracked and recorded. Other types of information not explicitly mentioned herein can also be tracked and recorded by embodiments of the source code access monitoring system.

Turning now to FIG. 1, a process flow 100 of a system for monitoring accesses to computer source code is generally shown in accordance with an embodiment. In an embodiment, the processing shown in FIG. 1 is performed by a source code access monitoring application executing on a processor. At block 102, the application detects an access to a source code repository by a user. In embodiments, the application is extended with plugins that monitor source code access such as, but not limited to the Eclipse Integrated Development Environment or Rational Team Concert™ (RTC) from IBM®. In other embodiments, the operating system or kernel could be extended to monitor logical disk sections that mapped to source code directories.

At block 104, the application determines whether the access is consistent with a history of accesses by the user which can be stored as user access history data in a file (e.g., database) corresponding to the user. The system can compare the user's current usage with the baseline of the user's past history to look for, for example, the user accessing a file that the user typically does not access. The system can also look for inappropriate or off-pattern searching for example by detecting search terms of common security flaws (e.g., searching for random number generated which could cause vulnerability if a random number pattern is found. The system can also look for inappropriate or off pattern accesses of high sensitivity portions of the source code which may contain latent security vulnerabilities. Examples of high sensitivity portions can include portions of source code that include input forms, database accesses, and areas of code which handle various types of input. The system can also look for an off pattern length of stay in a source code file (e.g., the user is viewing a function in a source code file for ten minutes while they typically only focus on this function for less than one minute.

If it is determined, at block 104, that the access is consistent with a history of accesses by the user, then block 106 is performed and the user access history data is updated with information about the access.

If it is determined, at block 104, that the access is not consistent with a history of accesses by the user then block 108 is performed to analyze the access for a reason for the user to perform the access. In embodiments, the analyzing is based on information about the user and information about the access. The information about the access can include, but is not limited to: actions taken by the user during the access (e.g., mouse clicks, editing, etc.); a length of time of the access; a time of day of the access. The information about the user can include, but is not limited to, a role of the user in a project or department and expected accesses associated with the role. The information about the user can also include information about work requests assigned to the user. Information in a project lifecycle tool such as RTC can be utilized to determine project information (roles of users, current work tasks, etc.). For example, based on information stored by a tool such as RTC it can be determined that if "Task X" is assigned to the user, then it would be logical for the user to access "Source Code Y." The analyzing performed in block 108 can also be based on information about defects associated with the source code in the source code repository. Defect information can be obtained from a tool such as RTC and based on the defect information the system can determine information such as, but not limited to, source code accesses expected for particular (or a group) of defects, a defect list for a particular project, a list of defects assigned to a particular user.

In an embodiment, the system utilizes team structure, defect tools, RTC tasks, etc. to determine if the source code access could be legitimate. The system can follow a pattern of file usage to verify that the file flow is viable (e.g., the user accesses file 1 which calls a function from file 2 which references an object from file 3). The system can also examine the user's defect list for stack traces and the analysis can determined if the stack trace suggest the user should be in the particular file. The system can also compare typical access patterns of peers (e.g., team structure, role) of the user to determine for example, that the source code file is not in the user's typical usage pattern but it is in the typical usage pattern of a peer of the user or another member of the user's team (e.g., users assigned to the same project or in the same department). The analyzing can also include determining that the user is acting for a peer (e.g., who is on vacation or out sick), that the peer is assigned a defect, and that the access to the source code is typical for the peer. The system can use the user's role on a team or department to determine if there is a reason for the access. For example, if the user has the role of a developer on a particular project team, then the analyzing can determine that an access that includes making changes to source code (even particular source code) is normal behavior for a developer on the particular project team.

In an embodiment, the analyzing can utilize a calendar tool to determine that the peer is on vacation. In an embodiment, the analyzing can use a change history on a file to determine whether the user can be in a source code file based on defects assigned to the user for correction. For example, a script file may indicate that ten of the last twelve updates to the source code were related to defects about a "classpath problem." If the user has a defect assigned to him or her related to "classpath problem", then the user has a reason to be in the file.

If a reason for the user to access the source code is detected by the analyzing as determined at block 110, then block 114 is performed and the user access history data can be updated based on the access. This allows for the history associated with the user to adapt based on current accesses by the user. Saving the investigation and reason as to why the system accepted the user into the source code will allow the system to have the proper checkpoint data in the future.

The next time the user or a user similar to the current user accesses this source code it will have data to utilize to help the analysis engine determine if the user (or similar user) has a valid reason to be viewing the source code. In addition, the system can determine whether this was a one-time exception for the user because they were acting for a co-worker who was on vacation or if this data point will become a common pattern or occurrence for the user.

In a reason for the user to access the source code is not detected by the analyzing as determined at block 110, then block 112 is performed and a notification can be sent, for example, to a supervisor of the user or to a security administrator of the source code.

In an embodiment, a notification is sent to a supervisor or security officer or log whenever block 108 is performed due to the access not being consistent with a history of accesses by the user.

Figure 2:
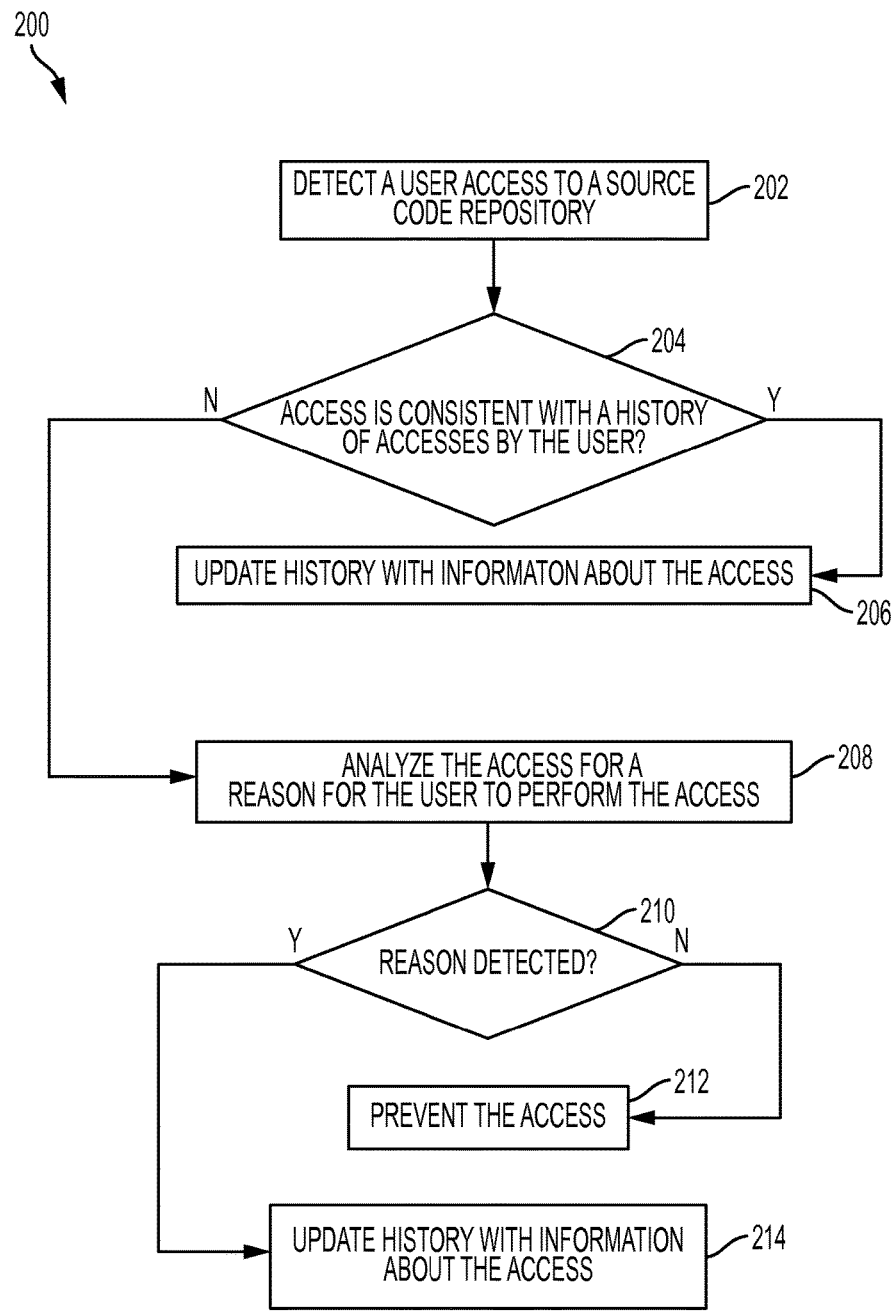
FIG. 2 depicts a process flow for monitoring accesses to computer source code in accordance with some embodiments of this disclosure.

Turning now to FIG. 2, a process flow 200 for monitoring accesses to computer source code is generally shown in accordance with some embodiments. In an embodiment, the processing shown in FIG. 2 is performed by a source code access monitoring application executing on a processor. At block 202, the application detects an access to a source code repository by a user. Processing continues at block 204, where the application determines whether the access is consistent with a history of accesses by the user which can be stored as user access history data in a file (e.g., database) corresponding to the user. If it is determined, at block 204, that the access is consistent with a history of accesses by the user, then block 206 is performed and the user access history data is updated with information about the access.

If it is determined, at block 204, that the access is not consistent with a history of accesses by the user then block 208 is performed to analyze the access for a reason for the user to perform the access. If a reason for the user to access the source code is detected by the analyzing as determined at block 210, then block 214 is performed and the user access history data can be updated based on the access. If a reason for the user to access the source code is not detected by the analyzing as determined at block 210, then block 212 is performed and the user is prevented from performing the access or the access is aborted if it is already in process. In addition, a notification can be sent, for example, to a supervisor of the user or to a security administrator of the source code. The notification can be informational in nature, or another embodiment the supervisor can be given an option to approve or deny the access by the user. In an embodiment, the system can prevent the user from accessing the source code file. The system can ask the user for reasoning and/or proof of why they are performing the access (e.g., can ask for a defect identifier or a work task). Different actions can be performed at block 212 based on the sensitivity and/or importance of the source code that the user is attempting to access. Different actions can also be performed at block 212 based on the role associated with the user (e.g., higher level managers may not be prevented from performing the access).

Embodiments described herein can reduce the number of false positives by considering likely alternative legitimate reasons for the user to access new source code or to access source code in a new way (e.g., editing when all past accesses have been reads). Embodiments described herein can be utilized to build a baseline usage pattern of code; build a baseline usage patter of IDE; detect new off-pattern usage; analyzing against a set of filters to determine possible legitimacy of off-pattern usage; and send a notification if the access does not appear to be legitimate.

In alternate embodiments, "gray" reasoning can be used instead of "black and white" reasoning. For example, the system can provide a score of likely legitimacy of an access. This score can be used to ratchet up more drastic action (e.g., prevent access) or simply provide advice to a supervisor/manager via a notification.

The systems and methods described herein may be implemented in hardware, software (e.g., firmware), or a combination thereof. In some embodiments, the methods described may be implemented, at least in part, in hardware and may be part of the microprocessor of a special or general-purpose computer system, such as a personal computer, workstation, minicomputer, or mainframe computer.

Figure 3:
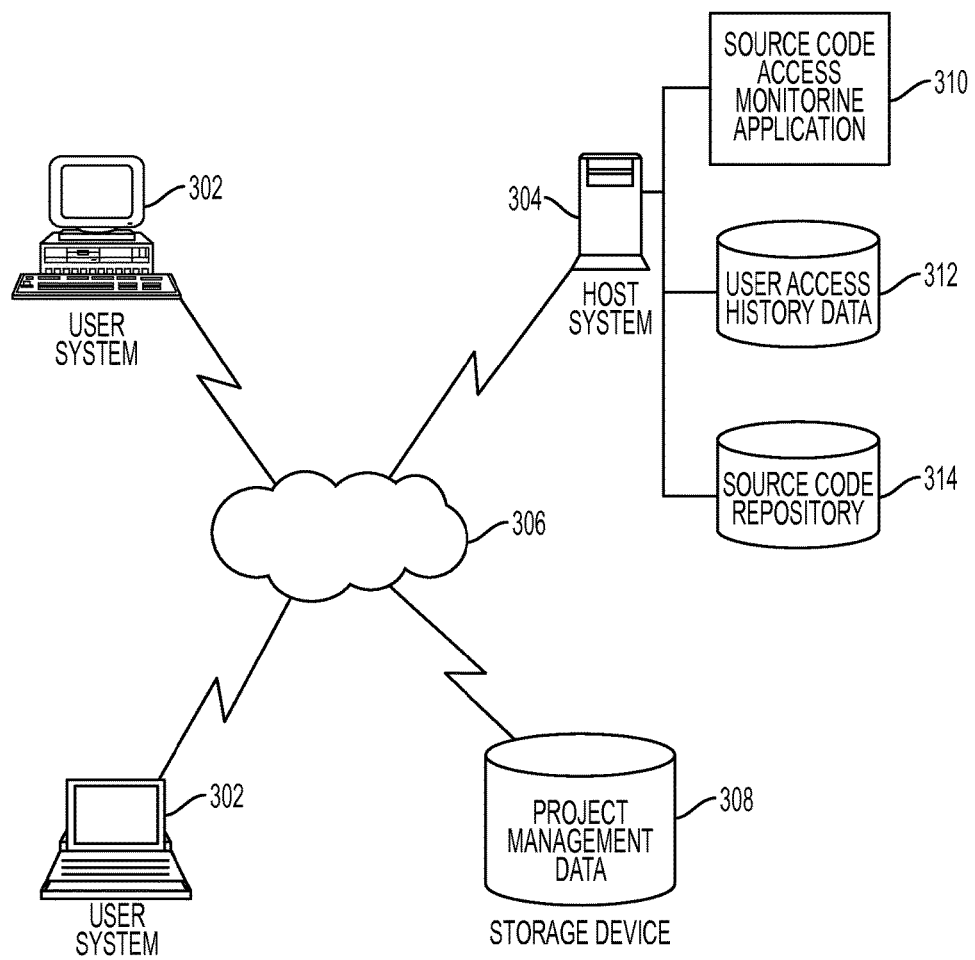
FIG. 3 depicts a block diagram of a computer system for implementing some or all aspects of the system, according to some embodiments of this disclosure.

Referring to FIG. 3, a block diagram of a system 300 for monitoring accesses to computer source code is generally shown in accordance with some embodiments. The system includes a source code access monitoring application 310 that is executed by one or more computer programs located on a host system 304. The system 300 depicted in FIG. 3 also includes one or more user systems 302 through which users at one or more geographic locations may contact the host system 304. In an embodiment, users access/attempt to access source code files located in the source code repository 314 via the user systems 302. The user systems 302 are coupled to the host system 304 via a network 306. Each user system 302 may be implemented using a general-purpose computer executing a computer program for carrying out the processes described herein. The user systems 302 may be personal computers (e.g., a lap top, a tablet computer, a cellular telephone) or host attached terminals. If the user systems 302 are personal computers, the processing described herein may be shared by a user system 302 and the host system 304.

The network 306 may be any type of known network including, but not limited to, a wide area network (WAN), a local area network (LAN), a global network (e.g. Internet), a virtual private network (VPN), and an intranet. The network 306 may be implemented using a wireless network or any kind of physical network implementation known in the art. A user system 302 may be coupled to the host system through multiple networks (e.g., cellular and Internet) so that not all user systems 302 are coupled to the host system 304 through the same network. One or more of the user systems 302 and the host system 304 may be connected to the network 306 in a wireless fashion. In one embodiment, the network is the Internet and one or more user systems 302 execute a user interface application (e.g. a web browser) to contact the host system 304 through the network 306. In another exemplary embodiment, the user system 302 is connected directly (i.e., not through the network 306) to the host system 304. In a further embodiment, the host system 304 is connected directly to or contains the storage device 308. In an embodiment, the user systems 302 have support for user interface screens displayed on display devices that can be used for data input and/or output.

The storage device 308 includes data relating to project management or lifecycle management such as that provided by a tool such as RTC and may be implemented using a variety of devices for storing electronic information. Though shown as a separate from the storage device 308, the user access history data 312 and/or the source code repository 314 may be completely or partially contained in the storage device 308. The term storage device 308 when used herein includes the user access history data 312 and the source code repository 314. It is understood that the storage device 308 may be implemented using memory contained in the host system 304 or that it may be a separate physical device. The storage device 308 is logically addressable as a consolidated data source across a distributed environment that includes the network 306. Information stored in the storage device 308 may be retrieved and manipulated via the host system 304 and/or via a user system 302. The user access history data 312, source code repository 314, and project management data in the storage device 308 may be implemented using any technology that supports the processing described herein. For example, the data warehouse user access history data 312 may be implemented as a relational database with structured query language (SQL) queries used to access the data.

The host system 304 depicted in FIG. 3 may be implemented using one or more servers operating in response to a computer program stored in a storage medium accessible by the server. The host system 304 may operate as a network server (e.g., a web server) to communicate with the user system 302. The host system 304 handles sending and receiving information to and from the user system 302 and can perform associated tasks. The host system 304 may also include a firewall to prevent unauthorized access to the host system 304 and enforce any limitations on authorized access. For instance, an administrator may have access to the entire system and have authority to modify portions of the system. A firewall may be implemented using conventional hardware and/or software as is known in the art.

The host system 304 may also operate as an application server. The host system 304 executes one or more computer programs, including a source code access monitoring application 310, to perform the functions described herein. Processing may be shared by the user system 302 and the host system 304 by providing an application to the user system 302. Alternatively, the user system 302 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Technical effects and benefits of some embodiments include the ability to record a user's typical usage patterns within a source code repository to determine out of the ordinary viewing and editing activities. Embodiments can be utilized to reduce the number of false positives a typical security product generates through monitoring new/suspicious activity and determining if the activity could be legitimate based on factors such as user role, program flow, team structure, defect analysis, etc. Embodiments can prevent access and/or send a notification when a reason for an access is not detected.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising;
    detecting, by a processor, actions by a user while the user is accessing a source code file in a source code repository, at least a subset of the actions selected from the group consisting of mouse clicks and keyboard activity, the processor remote from the user;
    determining, by the processor, whether the access is consistent with a history of accesses by the user to the source code repository, the history of accesses comprising portions of source code files accessed by the user, and viewing and editing times corresponding to the portions of source code files; and
    based on determining that the access is not consistent with the history of accesses by the user:
        analyzing the access for a reason for the user to perform the access, the analyzing based on information about the user and information about the access, the information about the user including work tasks assigned to the user; and
        generating a notification of the access based on the analyzing resulting in an absence of a reason for the user to perform the access.

2. The method of claim 1, further comprising updating the history of accesses with the information about the access based on determining that the access is consistent with the history of accesses by the user.

3. The method of claim 1 further comprising updating the history of accesses with information about the access based on the analyzing detecting a reason for the user to perform the access.

4. The method of claim 1, wherein the generating a notification of the access is further based on the analyzing detecting a reason for the user to perform the access.

5. The method of claim 1, wherein the user is prevented from performing the access based on the analyzing detecting an absence of a reason for the user to perform the access.

6. The method of claim 1, wherein the information about the user includes a role of the user and the analyzing is further based on expected source code repository accesses associated with the role.

7. The method of claim 1, wherein the information about the access includes actions taken by the user during the access.

8. The method of claim 1, wherein the information about the access includes one or both of a length of time of the access and a time of day of the access.

9. The method of claim 1, wherein the analyzing is further based on information about defects associated with source code in the source code repository.

10. A system comprising:
a memory having computer readable instructions; and
one or more processors for executing the computer readable instructions, the computer readable instructions comprising:
detecting, by a processor, actions by a user while the user is accessing a source code file in a source code repository, at least a subset of the actions selected from the group consisting of mouse clicks and keyboard activity, the processor remote from the user;
determining, by the processor, whether the access is consistent with a history of accesses by the user to the source code repository, the history of accesses comprising portions of source code files accessed by the user, and viewing and editing times corresponding to the portions of source code files; and
based on determining that the access is not consistent with the history of accesses by the user:
analyzing the access for a reason for the user to perform the access, the analyzing based on information about the user and information about the access, the information about the user including work tasks assigned to the user; and
generating a notification of the access based on the analyzing resulting in an absence of a reason for the user to perform the access.

11. The system of claim 10, wherein the computer readable instructions further comprise updating the history of accesses with the information about the access based on determining that the access is consistent with the history of accesses by the user.

12. The system of claim 10, wherein the computer readable instructions further comprise updating the history of accesses with information about the access based on the analyzing detecting a reason for the user to perform the access.

13. The system of claim 10, wherein the generating a notification of the access is further based on the analyzing detecting a reason for the user to perform the access.

14. The system of claim 10, wherein the user is prevented from performing the access based on the analyzing detecting an absence of a reason for the user to perform the access.

15. The system of claim 10, wherein the information about the user includes a role of the user and the analyzing is further based on expected source code repository accesses associated with the role.

16. The system of claim 10, wherein the information about the access includes actions taken by the user during the access.

17. A computer program product comprising a non-transitory computer readable storage medium having program instructions embodied therewith, the program instructions executable by a processor to cause the processor to perform:
detecting, by the processor, actions by a user while the user is accessing a source code file in a source code repository, at least a subset of the actions selected from the group consisting of mouse clicks and keyboard activity, the processor remote from the user;
determining, by the processor, whether the access is consistent with a history of accesses by the user to the source code repository, the history of accesses comprising portions of source code files accessed by the user, and viewing and editing times corresponding to the portions of source code files; and
based on determining that the access is not consistent with the history of accesses by the user:
analyzing the access for a reason for the user to perform the access, the analyzing based on information about the user and information about the access, the information about the user including work tasks assigned to the user; and
generating a notification of the access based on the analyzing resulting in an absence of a reason for the user to perform the access.

18. The computer program product of claim 17, wherein the program instructions further cause the processor to perform:
updating the history of accesses with the information about the access based on determining that the access is consistent with the history of accesses by the user; and
updating the history of accesses with information about the access based on the analyzing detecting a reason for the user to perform the access.

* * * * *